United States Patent [19]

DiMatteo et al.

[11] 4,249,827
[45] Feb. 10, 1981

[54] ARRANGEMENT FOR COLOR CODING OF SURFACES

[75] Inventors: Paul DiMatteo, Huntington; Howard K. Stern, Greenlawn, both of N.Y.

[73] Assignee: Solid Photography Inc., Melville, N.Y.

[21] Appl. No.: 896,891

[22] Filed: Apr. 17, 1978

[51] Int. Cl.³ .................................. G01N 21/25
[52] U.S. Cl. ............................. 356/402; 250/226; 340/146.3 B; 356/418; 364/526
[58] Field of Search ................ 340/146.3 B; 250/226, 250/558; 356/71, 2, 375, 398, 402, 404, 416, 418, 419, 425; 364/526

[56] References Cited

U.S. PATENT DOCUMENTS

| | | | |
|---|---|---|---|
| 3,513,320 | 5/1970 | Weldon | 250/226 |
| 3,663,801 | 5/1972 | Wahli et al. | 340/146.3 B X |
| 3,990,043 | 11/1976 | Clark | 250/226 |
| 4,143,971 | 3/1979 | Levy et al. | 356/404 |

OTHER PUBLICATIONS

Pavanati, *IBM Technical Disclosure Bulletin*, vol. 19, No. 6, Nov. 1976, pp. 2123 and 2124.

*Primary Examiner*—F. L. Evans
*Attorney, Agent, or Firm*—Max Fogiel

[57] ABSTRACT

An arrangement in which different surfaces of an object have applied to them transparent layers of different colors. Each layer will transmit one or more colors, while inhibiting the transmission of one or more other colors. By applying different color layers or paints, so that the combination of layers have different transmission characteristics, different surfaces of an object may be uniquely identified. To identify a predetermined surface, the colors applied thereon are noted, and the surface is illuminated. A filtering arrangement used in conjunction with either the illuminating source or a photograph camera, causes unique exposure of the film, for a predetermined combination of color filter and color paints applied in sequence on the surface being examined.

10 Claims, 2 Drawing Figures

ARRANGEMENT FOR COLOR CODING OF SURFACES

BACKGROUND OF THE INVENTION

In the manufacture or production of articles, it is often desirable to be able to identify different surfaces of the article for purposes of applying different production processes thereto. For example, an article may have different surfaces requiring different machining tolerances, and different machining procedures or tools. Color coding of surfaces is also particularly useful when analyzing surfaces to obtain their geometrical characteristics. In such cases, a surface may be subdivided into parallel, horizontal or vertical planes, for example, and each planar section thus generated on this surface by such subdivision thereof, can be conveniently identified by a color coding process.

When mass-producing parts or articles in manufacture by automatic equipment, it is furthermore useful to color code different surfaces whereby the different machine tools or production equipment may be activated and applied when a predetermined surface of the part or article is exposed preparatory for a predetermined manufacturing step.

It is therefore an object of the present invention to provide a color coding arrangement for surfaces, which will result in uniquely identifying a surface as a result of predetermined colors applied thereto.

Another object of the present invention is to provide an arrangement of the foregoing character which is substantially simple in construction and may be applied without the use of complex equipment.

A further object of the present invention is to provide a color coding arrangement, as described, which may be economically produced and practiced.

SUMMARY OF THE INVENTION

The objects of the present invention are achieved by applying to different surfaces of an object, different combinations of transparent layers of colors. The surfaces are then illuminated by a source of white light, for example, and photographed by a camera in the presence of selective filters placed either between the source of light and the object, or between the camera and the object. By noting which color filter is being used in combination with the surface being photographed, a series of film exposures resulting with different filters, may be used to identify uniquely the surface being thus photographed.

The camera may be a black-white camera used in conjunction with a source of illumination and color filters, or the camera may be a color camera used in conjunction with a white source of light, for example.

To identify a color-coded surface, the sequence of photograph frames taken with the camera, are scanned to determine which frame has been exposed in conjunction with a predetermined filter that was used for that particular exposure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
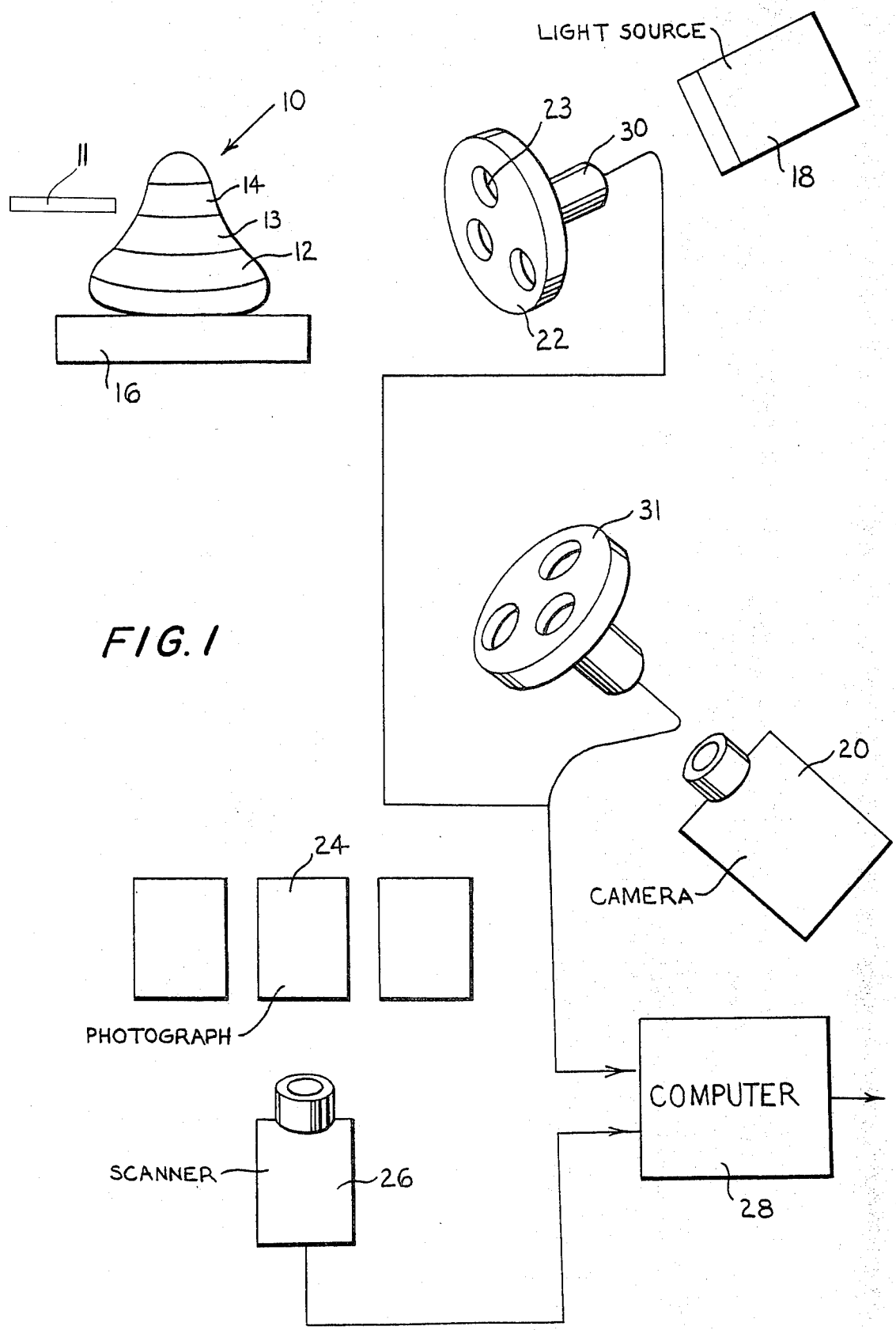
FIG. 1 is a schematic view and shows the essential elements and their cooperative interrelationships, in accordance with the present invention.

Referring to the drawings, an object 10 has different surfaces 12-14, for example, which are to be treated differently in a production process. Such different surface treatments may consist of, for example, applying different milling cutters or different cutting surfaces of a milling cutter to the different surfaces on the object 10, for the purpose of forming that surface. The contour of the surface section 12, for example, may require a predetermined milling cutter with predetermined cutting surface profile, which is different from the required milling cutter for the neighboring surface element 13. Alternately, the same milling cutter to be used throughout, may be required to have a different orientation so as to expose a different cutting profile for each of the different surface segments 12-14. To apply the desired tool in such an arrangement, therefore, it is necessary to identify the different surface sections 12-14. For the sake of maintaining the description simplified, reference numerals 12-14 have been applied to only 3 surface sections of the object 10, whereas the latter may be subdivided, of course, into numerous additional sections.

For purposes of identifying uniquely each of the different surface sections on the object 10, each section is painted with a series of different colors applied in layers or coats by the color applying means 11. To understand how such application of layers of paints may be used for such identification purposes, it may be helpful to consider an opaque white paint or ink. The base is a liquid "vehicle," usually linseed oil. The vehicle is quite colorless and transparent. Suspended in it are tiny particles of equally colorless and transparent material, such as an oxide of lead, zinc, or titanium. The index of refraction of the suspended material must be as different as possible from that of the vehicle. When a ray of light strikes the surface of the white paint, some light will be reflected at the air-vehicle surface, since there is a change in index at this surface. The remainder penetrates into the paint and strikes a boundary between vehicle and suspended particle, where again a portion is reflected. The reflected part returns through the surface, and the part remaining penetrates further, a portion being reflected at each boundary surface which it crosses. Since reflection occurs whatever the wavelength of the incident light, the paint reflects uniformly throughout the spectrum, or in other words, it is "white". The white "color" is not produced by suspending white particles in the vehicle. It is due to a difference in index between particle and vehicle, both of which are transparent.

If a colored paint or ink is desired, the suspended particles are dyed the desired color, or other dyed particles are added to the white paint. The dyed particles then behave as tiny filters in the path of the light rays in the paint. The light reflected back out of the paint must pass through many of these filters on its way in and out, each filter absorbing some of the light incident upon it. The spectral distribution of the incident light is modified by this absorption, and results in coloring the paint. The same spectral distribution will be obtained without reflecting particles being present in the paint if a white reflecting surface is located beneath the coat containing the dyed particles.

When blue and yellow layers of paint are applied to a surface, for example, then the light rays will pass through both the blue and yellow filters before making their way out of the surfaces of the layers. The effect is substantially the same as produced when a blue and yellow filter are placed in series in the path of a light beam. If the layers obtained are illuminated by white light, then green will predominate in the reflected light, and the resulting color that will be noted from such blue and yellow layers is green. The occurs because the blue paint filters out red and the yellow paint filters out blue. Hence only green emerges from both layers.

The particular portion of the spectrum that each dye or paint controls, is that portion in which it absorbs. The greater the density or concentration, the more light is absorbed; the smaller its concentration, the less light is absorbed. Such absorbance characteristics may be attributed to three different dyes designated, for example, as "minus-red," "minus-green" and "minus-blue." The color of the "minus-red" dye or paint, when applied to a white surface and viewed by white light, is blue. The color of the "minus-green" is a reddish purple or magenta. The color of the "minus-blue" is yellow.

If, now, three colors are used in a digital combination of presence or absence, seven surfaces may be identified since $2^3 - 1 = 7$. This may be seen by considering the following tabular arrangement of three colors, 1, 2, 3 which may be used for example. In this table, the presence of any one of the three colors is denoted by an (x). It may be seen from this, that seven different arrangements (a) to (g) may be obtained.

| PRESENCE OF COLORS | | | |
|---|---|---|---|
| 1 | 2 | 3 | |
| x | X | x | (a) |
| x | x |   | (b) |
|   | x | x | (c) |
| x |   | x | (d) |
| x |   |   | (e) |
|   | x |   | (f) |
|   |   | x | (g) |

If several states are assigned to each color, more digital combinations are obtainable. For example, if at least one color is used at full intensity (substantially unattenuated) for every painted region, the following number of combinations result: $3^3 - 2^3 - 1 = 18$. Thus, each color has three allowable states in the form of full intensity, partial intensity or zero intensity. From this one might expect $3^3$ states. However, in $2^3$ states there is no full intensity color, and in one state all colors are zero. The full intensity state is necessary to provide for a basis of comparison in the intensity levels.

The object 10 with different surface sections or regions 12-14, for example, may be located on a support 16 and illuminated by a source 18 of white light. A camera 20 is placed in the path of reflected light from the object 10. A filter unit 22 may be located in the light path between the source 18 and the object 10.

If the object 10 is illuminated with white light and photographed sequentially with different color filters, a series of photographs will be obtained with different exposure characteristics. By knowing which color filter was used with an exposure or photograph, it is possible to determine the color that was photographed and it is thereby possible to identify the surface bearing that color.

In applying the present invention to a manufacturing operation, for example, the photograph 24 taken by the camera 20 may be examined or scanned by a scanner and comparator 26. The scanner views the photograph 24, which is a black-white photograph taken by a black-white camera 20. The scanner 26 determines whether the photograph 24 has been exposed or not at each particular location on the photograph. The output of the scanner 26 may be applied to a computer 28. Connected to the computer 28, is also the signal output of a transducer 30 which transmits a digital signal, for example, indicating which color filter is being used. For this purpose, different colored filters 23, when being used, have different associated rotational positions of the wheel 22. The transducer 30 connected to the wheel 22 senses the rotational postion of the wheel, and transmits a signal, in digital form to the computer 28. Elements such as transducer 30 are well known in the art, and are often referred to as shaft encoders. For this reason, this element is not described in further detail here.

The computer correlates the exposure information from the scanner 26 with the particular color filter being used at the time that the exposure was taken, and provides a calculated output which identifies the color of the surface that was photographed. Identification of the color results in identification of the given surface to which the color has been applied.

The exposure or non-exposure of the film may be detected by the scanner 26 and transmitted to the computer 28 by means of a digital signal in the form of, for example, 0,1. At the same time, however, the signals transmitted to the computer 28 may also be in analog form, using conventional analog signal transmission techniques. The color paints or dyes may be arranged so that the film in the camera 20 may be exposed by either the presence of a predetermined color or the absence thereof. Either information can be correlated by the computer 28.

It is not essential that the filter unit 22 be located within the light path between the source 18 and the object 10. It is possible to use instead, or in addition thereto, another filter unit 31 within the light path between the object 10 and the camera 20. When convenient, for example, the additional or auxiliary filter unit 31 may be positioned within the light path or removed therefrom.

Figure 2:
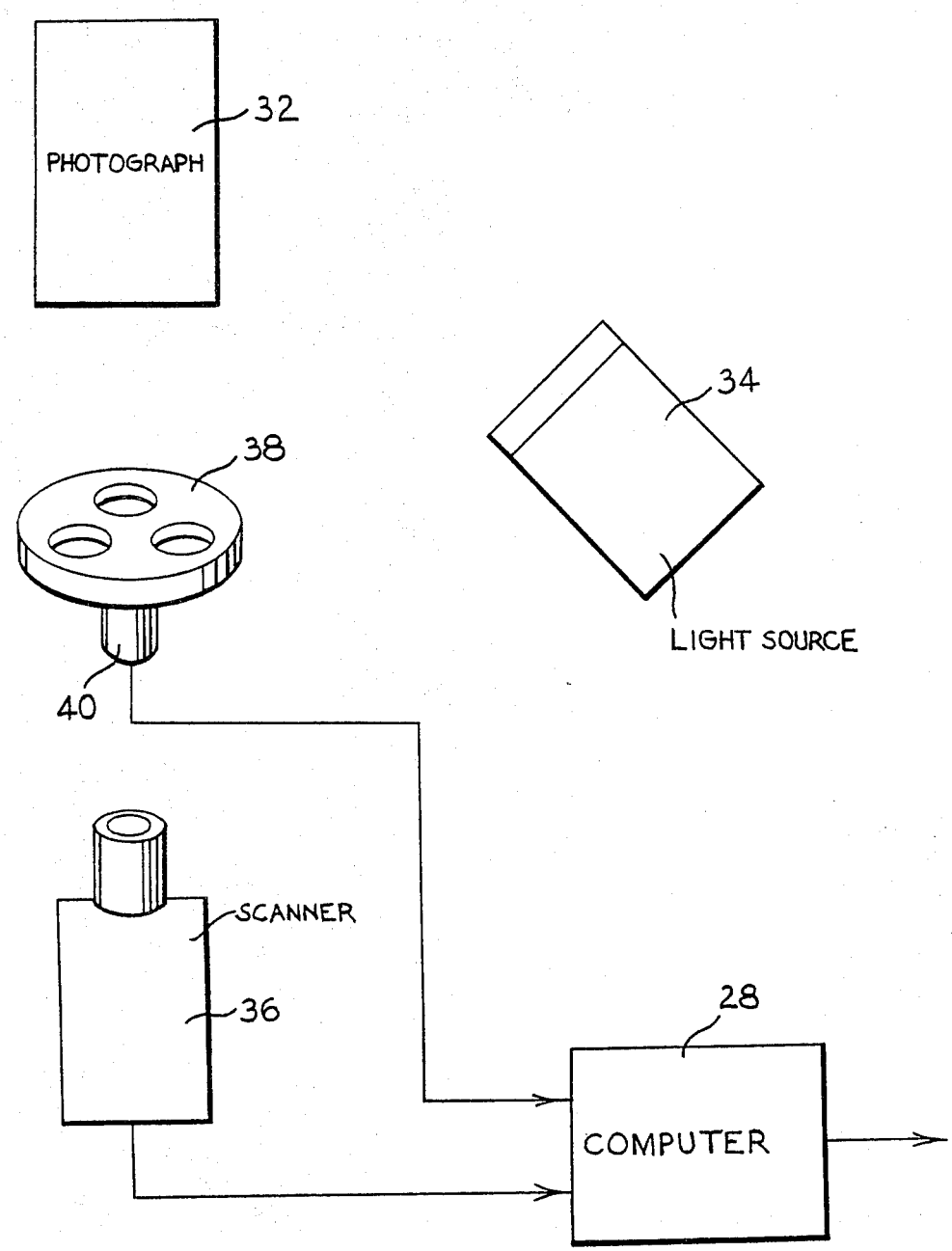
FIG. 2 is a schematic view and shows an arrangement used in conjunction with FIG. 1 when applying color photograph.

When using a color camera in the place of a black-white camera, it is not necessary to use filter units. In that event, the photographs taken by the camera are color photographs, and these may be analyzed as shown in FIG. 2, by illuminating the color photograph 32 by a source of white light 34. A scanner 36 used in conjunction with a filter unit 38, can identify the color on the photograph by sensing the presence or absence of transmitted light through the filter, and correlating the information with the particular filter being used in a computer, as previously described. The filter unit 38 in this arrangement, is similar to the filter unit 22, and operates in conjunction with a transducer 40 which is also substantially identical to the unit 30.

The camera used in the present invention, may also be in the form of a black-white or color television camera. In such cases, the scanner 26 would view the screens of a corresponding black-white or color television receiver instead of photographic prints, for example. Alternatively the video output from the TV camera may be decoded according to color and intensity, and this information may be sent to the computer. The use of television apparatus, for this purpose, is particularly advantageous in continuous-flow manufacturing processes, in which parts or articles are fabricated on a continuous basis.

In manufacturing processes, it is often required to subject the fabricated articles or parts to inspection procedures, wherein the shape, size or smoothness of the object are compared to a standard. The fabricated part or object may often possess numerous features, each of which may be associated with different tolerance bands. The present invention provides for a rapid comparison system in which individual surfaces or features of the object may be identified and measurements may be correspondingly applied for comparison to determine whether the fabricated parts are within the allowable manufacturing tolerances. This is of particular importance during processes using three-dimensional information sensing techniques such as disclosed in U.S. Pat. No. 3,866,052.

For purposes of color coding the different surfaces of the object, a separate color paint may be applied to each surface region to be identifed, or different combinations of coats or layers of transparent paints may be applied.

In lieu of the white source of light and a separate filtering unit 22, the source of colored light may be used. Such an arrangement may be considered as having the filter built into the light source. Denoting or recording of the particular colored light being used, for processing by the computer 28, is the same as in the arrangement described previously.

In taking multiple photographs by the camera, the relative light values are observed, provide the basis for identifying the color on either a digital or analog basis. The relative light values to be observed may be in the form of film density, television signal, or photocell outputs.

Whereas the source of illumination may be white light or colored light, electromagnetic radiation of other frequencies may also be used, as for example, infrared.

The color coding arrangement used in accordance with the present invention has also the advantageous feature that the number of photographs taken can be considerably less than the number of surfaces to be identified. Thus by taking three photographs with three different filters, for example, seven different surfaces may be identified. This feature is of particular importance in the aforementioned U.S. Pat. No. 3,866,052 which discloses a method for generating signals defining three-dimensional object surfaces. For purposes of defining the location of an object surface point in space, the surface is subdivided into a plurality of planar segments which are encoded. The planar segments or bands may be encoded using a pure binary code, decimal-binary codes, or ternary codes, for example. In such an arrangement, the object 10 is subdivided into parallel surface sections such as shown in FIG. 1. A color scheme can be applied advantageously, in accordance with the present invention, for purposes of identifying the parallel planar surface sections. In such a color scheme, three distinct colors as, for example, red, green and blue may be used.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for color coding surfaces of an object comprising the steps of: applying at least one color to a surface of the object; illuminating said surface with electromagnetic radiation; modifying said electromagnetic radiation in accordance with a predetermined color dependent function; observing at least one characteristic in electromagnetic radiation reflected from said surface; combining a predetermined number of colors in a digital combination of presence and absence to identify uniquely each of a plurality of surfaces; said color applying step including applying said color with layers of transparent paint having a colorless vehicle with colored particles suspended therein, said particles having an index of refraction differing from the index of refraction of the vehicle, said particles forming filters in paths of light rays in the paint, incident light reflected back out of the paint passing through said filters when entering and exiting and each filter absorbing some light incident upon it, the spectral distribution of incident light being modified by the absorption of coloring the paint; said illuminating step comprising illuminating the surfaces during a plurality of separate intervals with colored light; the light color during each interval being different from the light colors illuminating said surfaces during other intervals; said observing step including photographing said surfaces during each said interval; scanning each photograph in sequence and sensing said characteristic in reflections from said surfaces; and correlating said characteristic with said color dependent function for identifying the color applied to said surface; said correlating step including the step of relating the number of surfaces to the number of photographs by a digital code so that the number of photographs taken is substantially less than the number of surfaces to be identified.

2. A method as defined in claim 1 including the step of introducing a color filter in the path of said electromagnetic radiation for modifying said electromagnetic radiation in accordance with said predetermined color dependent function.

3. A method as defined in claim 1 wherein said observing step includes applying reflections from said surface to a television camera.

4. A method as defined in claim 1 wherein said photographing steps are carried out with a color camera.

5. A method as defined in claim 3 wherein said television camera is a color camera.

6. A method as defined in claim 1 wherein said photographing steps are carried out with a black-white camera.

7. A method as defined in claim 3 wherein said television camera is a black-white camera.

8. A method as defined in claim 1 wherein said correlating step is carried out within a computer.

9. A method as defined in claim 3 including the step of scanning signals transmitted from said television camera for sensing said characteristic in reflections from said surface.

10. Apparatus for color coding surfaces of an object comprising, in combination: means for applying at least one color to a surface of the object; means for illuminating said surface with electromagnetic radiation; means for modifying said electromagnetic radiation in accordance with a predetermined color dependent function; means for observing at least one characteristic in reflections from said surface; said color applying means applying said color with layers of transparent paint having a colorless vehicle with colored particles suspended therein, said particles having an index of refraction differing from the index of refraction of the vehicle, said particles forming filters in paths of light rays in the paint, incident light reflected back out of the paint passing through said filters when entering and exiting and each filter absorbing some light incident upon it, the spectral distribution of incident light being modified by the absorption for coloring a paint; the predetermined number of colors being combined in a digital combination of presence and absence to identify uniquely each of a plurality of surfaces; said illuminating means illuminating the surfaces during a plurality of separate intervals with colored light, the light color during each interval being different from the light colors illuminating said surfaces during other intervals; said observing means photographing said surfaces during each said interval; means for scanning each photograph in sequence and sensing said characteristic in reflections from said surfaces; and means for correlating said characteristic with said color dependent function for identifying the color applied to said surface, said correlating means relating the number of surfaces to the number of photographs by a digital code so that the number of photographs taken is substantially less than the number of surfaces to be identified.

* * * * *